July 26, 1960 E. G. ABBOTT 2,946,622
DOORS FOR MOTOR ROAD VEHICLES
Filed May 5, 1959
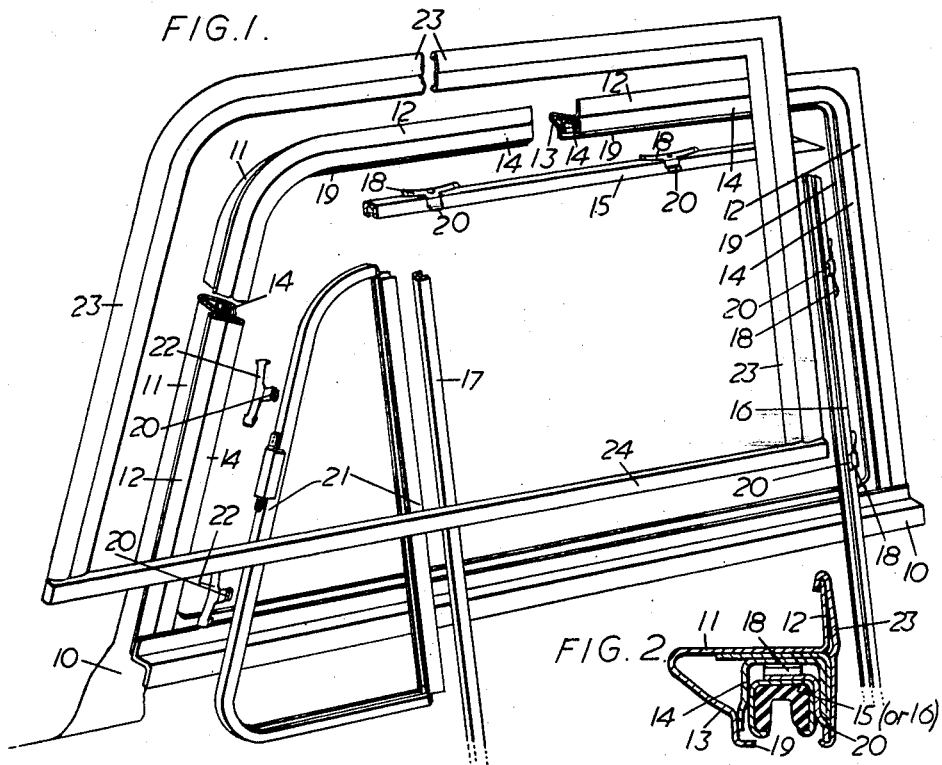
Inventor
Edward G. Abbott
By: Skinner and Parker
Attorneys

United States Patent Office 2,946,622
Patented July 26, 1960

2,946,622

DOORS FOR MOTOR ROAD VEHICLES

Edward G. Abbott, Rednal, Birmingham, England, assignor to The Austin Motor Company Limited, Birmingham, England Filed May 5, 1959, Ser. No. 811,061

Claims priority, application Great Britain May 14, 1958

4 Claims. (Cl. 296—44)

This invention relates to doors for motor road vehicles and of the kind in which the upper part of the door is provided or formed with a fixed window frame for a vertically adjustable window which is slidable in vertical guide channels within said fixed frame.

In this kind of door, as hitherto constructed, the top edge of the vertically adjustable window, when closed, is received within a fixed channel member lined with pile fabric or other appropriate soft or resilient material, and the guide channels which embrace the vertical edges of the adjustable window are also fixed and similarly lined to minimise rattle or noise.

Usually the top edge receiving channel and the vertical guide channels are in stainless steel, or chromium plated, or distinctively painted, to give a neat and pleasing finish.

According to the invention, the fixed window frame of a door of the kind referred to has an outwardly directed boundary flange on its exterior side and an inwardly directed boundary flange on its interior side, and is reinforced by a channel section member within which a top edge receiving channel and one, at least, of the vertical guide channels are mounted to slide and are spring-loaded inwardly toward limiting abutment means, whilst a separate external trim frame, in any appropriate or desired finish, is adapted to be passed slidably into hooked or embracing engagement with the edge of said outwardly directed boundary flange and to be held in position by catches on the exterior side of said spring-loaded top edge receiving channel and that of said spring-loaded vertical guide channel or channels for the sliding windows.

The limiting abutment means for the spring-loaded top edge receiving channel and the spring-loaded vertical guide channel or channels may be afforded by a laterally directed lip or lips on the inner edge of the inwardly directed boundary flange on the interior side of the fixed frame.

The arrangement is such that after passing the separate external trim frame into hooked or embracing engagement with the free edge of the outwardly directed flange on the external side of the fixed frame, the spring-loaded top edge receiving channel and the spring-loaded guide channel or channels can be forced outwardly against their spring loading and then be released to enable their catches to be carried into engagement with retaining abutment means on the inner marginal portion of the trim frame so as to hold the latter in position. In this connection said inner marginal portion of the trim frame may be bent back upon itself to afford a groove with which the said catches can engage.

Preferably the fixed window frame will be formed integrally with the interior panel of the door.

An embodiment of the invention as applied to a motor car front door is illustrated, by way of example, in the accompanying drawings in which:

Fig. 1 is a fragmentary exploded perspective view of the upper part of the door and the associated window frame parts.

Fig. 2 is a cross section of the assembled window frame parts.

Referring to the drawings, the motor car front door 10 has a fixed window frame 11 having an outwardly directed boundary flange 12 on its exterior side and an inwardly directed boundary flange 13 on its interior side. This fixed frame 11 is reinforced by a channel section member 14 within which a channel 15, for receiving the top edge of a vertically sliding window, and a vertical guide channel 16 for the rearmost edge of said sliding window are mounted to slide. The cross-section of the fixed frame 11 and also that of the channel section reinforcing member 14, which has its base welded to the inner face of the transverse web portion of said fixed frame 11, are constant, and said reinforcing channel member 14 runs throughout the length of said fixed frame, that is to say throughout the upwardly and rearwardly inclined front portion, the upper horizontal portion and the rear vertical portion. A complementary vertical guide channel 17 for the forward vertical edge of the sliding window is, in the completed assembly, fixed in the fixed frame, and the vertical guide channels 16, 17 extend down between the outer and inner panels of the door 10 as is usual.

The reinforcing channel member 14 has its open side presented inwardly to accommodate slidably between its flanges the top edge receiving channel 15 and the rearmost vertical guide channel 16, and spot welded to the bases of said channels 15, 16 at spaced points in their lengths are strip steel semi-elliptic or bow-shaped springs 18 which urge said channel 15 downwardly and said channel 16 forwardly into engagement with a limiting abutment or stop afforded by a lateral lip 19 on the edge of the inwardly directed interior flange 13 of the fixed frame 11. Formed integrally with said strip steel bow springs 18, and centrally thereof, are catches or catch portions 20 which are inwardly directed across the exterior flanges of said spring-loaded channels 15, 16 and have their free inner ends offset somewhat.

That part of the window frame which is forwardly of the fixed vertical guide channel 17 accommodates a frame 21 for a pivoted ventilator window. In the assembled structure, strip steel bow-shaped springs 22 are accommodated in the forward inclined portion of the reinforcing channel 14 and they also have integral catches or catch portions 20 with offset inner free ends.

In order to give the window frame assembly a neat external appearance, a trim frame 23 is provided. This trim frame 23, which is made of strip metal, say, for example, chromium plated brass strip or stainless steel strip, is a closed figure conforming generally with the shape of the fixed frame 11 to which it is to be applied and has a horizontal bottom portion 24 which, when the trim frame 23 is applied, will cover or overlap the upper edge of the external panel of the door 10. The outer and inner margins of the vertical rear portion, the horizontal top portion and the downwardly and forwardly inclined portion of the trim frame 23 are bent back, as shown in Fig. 2, so that the bent back outer margin can be passed into embracing engagement with the free edge of the outwardly directed exterior flange 12 of the fixed frame 11 when the trim frame 23 is applied thereto, and that, by then forcing the spring-loaded channels 15, 16 and also the bow springs 22 outwardly and releasing them the offset inner ends of the catches 20 will engage the bent back inner margin of said trim frame 23 to retain the latter in position against accidental displacement.

Thus the invention provides for the door window a separate trim frame 23 which can be applied readily and which can, if necessary, be easily removed by forcing the spring-loaded channels 15, 16 outwardly to free the trim frame 23 so that it can be disengaged from the outwardly directed exterior flange 12 of the fixed window frame 11.

Having fully described my invention, what I claim and desire to secure by Letters Patent is:

1. A door for a motor road vehicle wherein the upper part of the door has a fixed window frame for a vertically adjustable window which is slidable in vertical guide channels within said fixed frame, said frame having an outwardly directed boundary flange on its exterior side and an inwardly directed boundary flange on its interior side, and also having a reinforcing channel section member secured thereto, a top edge receiving guide channel and at least one vertical guide channel mounted for sliding movement within said channel section member, a plurality of spring members within said channel section member and interposed between the latter and said guide channels and acting to resiliently urge said guide channels inwardly, limiting abutment means to limit the inward movement of said guide channels, said spring members being provided with inwardly directed catch portions, and a separate closed figure trim frame having an outer marginal portion for slidably embracing the edge of said outwardly directed boundary flange and having an inner marginal portion for slidably engaging said catch portions.

2. A motor road vehicle door as claimed in claim 1, wherein the limiting abutment means for the spring-loaded top edge receiving channel and the spring-loaded vertical guide channel comprise a laterally directed lip on the inner edge of the inwardly directed boundary flange on the interior side of the fixed frame.

3. A motor road vehicle door as claimed in claim 2, wherein the spring-loaded top edge receiving channel and the spring-loaded guide channel can be forced outwardly against their spring loading and then be released to enable the catch portions to be carried into engagement with retaining abutment means on the inner marginal portion of the trim frame so as to hold the latter in position.

4. A motor road vehicle door as claimed in claim 3, wherein the said retaining abutment means on the trim frame is afforded by bending back upon itself the inner marginal portion of said trim frame to provide a groove with which the catches can engage.

References Cited in the file of this patent

UNITED STATES PATENTS

| | | |
|---|---|---|
| 1,178,804 | Heulings | Apr. 11, 1916 |
| 2,177,462 | Schunk | Oct. 24, 1939 |
| 2,383,575 | Wernig | Aug. 28, 1945 |